US008145376B2

(12) United States Patent
Sherony

(10) Patent No.: US 8,145,376 B2
(45) Date of Patent: Mar. 27, 2012

(54) SYSTEM FOR PRODUCING AN ADAPTIVE DRIVING STRATEGY BASED ON EMISSION OPTIMIZATION

(75) Inventor: Rini Sherony, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 455 days.

(21) Appl. No.: 12/371,815

(22) Filed: Feb. 16, 2009

(65) Prior Publication Data
US 2010/0211247 A1    Aug. 19, 2010

(51) Int. Cl.
*G01C 22/00*    (2006.01)
(52) U.S. Cl. .................. 701/23; 701/25; 701/26; 701/29
(58) Field of Classification Search ............ 701/23, 701/25, 26, 29, 213, 214
See application file for complete search history.

(56) References Cited

U.S. PATENT DOCUMENTS

| | | | |
|---|---|---|---|
| 4,333,070 A | 6/1982 | Barnes | |
| 6,151,549 A * | 11/2000 | Andrews et al. | 701/115 |
| 6,253,731 B1 | 7/2001 | Yoon | |
| 6,856,877 B2 | 2/2005 | Coelingh et al. | |
| 7,069,132 B2 | 6/2006 | Henneken et al. | |
| 7,693,626 B2 * | 4/2010 | Breed et al. | 701/29 |
| 7,957,861 B2 * | 6/2011 | McAndrew, III | 701/29 |
| 2007/0168125 A1 | 7/2007 | Petrik | |
| 2010/0152958 A1 * | 6/2010 | McAndrew, III | 701/29 |
| 2011/0137512 A1 * | 6/2011 | Harumoto et al. | 701/29 |

OTHER PUBLICATIONS

Nadeem et al., TrafficView: Traffic Data Dissemination Using Car-to-Car Communication, ACM Mobile Computing and Communications Review (MC2R), Special Issue on Mobile Data Management, vol. 8, No. 3, Jul. 2004, pp. 6-19.
Wayson et al., Development of a Modal Emissions Model Using Data from the Cooperative Industry/Government Exhaust Emission Test Program, Civil and Environmental Engineering, University of Florida.
Servin et al., An Energy and Emissions Impact Evaluation of Intelligent Speed Adaptation, Proceedings of the IEEE ITSC 2006, 2006 IEEE Intelligent Transportation Systems Conference, Toronto, Canada, Sep. 17-20, 2006. pp. 1257-1262.
Delphi Continues to Provide Leadership in Active Safety Technologies, www.delphi.com/news/pressReleases/pr_2007_09_05_001/, Sep. 5, 2007.
Barth et al., Modal Emissions Modeling: A Physical Approach, http://ntlsearch.bts.gov/tris/record/tris/00725658.html?view=printable, Oct. 27, 2008.

* cited by examiner

*Primary Examiner* — Toan To
(74) *Attorney, Agent, or Firm* — Gifford, Krass, Sprinkle, Anderson & Citkowski, P.C.

(57) ABSTRACT

The system includes a road scenario sensor, a vehicle control unit, and a computer processing unit. The road scenario sensor detects upcoming road scenarios for the system vehicle. The computer processing unit receives an input from the road scenario sensor and determines a upcoming driving event based upon the detected upcoming road scenarios. The computer processing unit compares the upcoming driving event with an ideal emissions model having acceptable emission thresholds to determine an adaptive driving strategy. The adaptive driving strategy configures the system vehicle to reduce emissions for the upcoming driving event. The adaptive driving strategy optionally includes an optimal acceleration rate and/or an optimal power management strategy. The optimal acceleration rate is based upon the required speed of the vehicle at the upcoming driving event and the distance from the vehicle to the upcoming driving event, and the ideal emissions model having acceptable emission thresholds.

19 Claims, 2 Drawing Sheets

SYSTEM FOR PRODUCING AN ADAPTIVE DRIVING STRATEGY BASED ON EMISSION OPTIMIZATION

FIELD OF THE INVENTION

The present invention relates to an emission optimization system for a vehicle. More particularly, the invention relates to an emission optimization system which detects upcoming road scenarios, to predict upcoming driving events, and determines an adaptive driving strategy which reduces emissions for the upcoming driving event.

BACKGROUND OF THE INVENTION

Vehicle emissions of carbon dioxide ($CO_2$) are of increasing concern as $CO_2$ is a principal greenhouse gas for global warming. In an effort to reduce the amount of $CO_2$ emitted from a vehicle several systems and methods have been developed. However, as there are many ongoing legislative efforts to mandate significant reduction in $CO_2$ emissions in vehicles new technologies are needed in addition to the previously known developments.

One such method for reducing the emission of $CO_2$ is known as an engine start-stop strategy. Start-stop technology reduces $CO_2$ by deactivating the engine of a vehicle when the vehicle brakes or when it comes to a stop. The engine restarts once the vehicle ceases braking or begins accelerating from a stopped position.

Another technology that achieves $CO_2$ reduction is known as an intelligent speed adaptation (ISA). ISA systems monitor the current speed of a vehicle and compare the current speed to the speed limit of the vehicle's current location or a speed limit based on current road or traffic scenarios. The system provides either a warning to the driver when the vehicle speed exceeds the speed limit and/or performs active speed control of the vehicle. As the speed of a vehicle and emissions produced are directly related, limiting the maximum speed of the vehicle affords some reduction in the emissions produced. However, current ISA applications are primarily used as a safety system to prevent vehicles from exceeding a speed limit, and, as such, are configured to limiting a maximum speed rather than reducing $CO_2$ emissions.

Neither the engine start-stop systems nor ISA systems take into account additional driving factors that can contribute to a reduction in $CO_2$ emissions, such systems merely discontinue the operation of the engine or limit the maximum speed. Accordingly, it is desirable to have a system which can contribute to the reduction of $CO_2$ emissions that result from driving factors not addressed by previously known methods. Further, it is desirable to have a system which can be used in combination with previously known $CO_2$ reduction methods which would result in additional $CO_2$ reduction.

SUMMARY OF THE INVENTION

According to one aspect of the invention, a system and method for reducing the emissions of a system vehicle through the use of an adaptive driving strategy is provided. The system includes a road scenario sensor, a vehicle control unit, and a computer processing unit. The road scenario sensor detects upcoming road scenarios for the system vehicle. The computer processing unit receives an input from the road scenario sensor and determines an upcoming driving event based upon the detected upcoming road scenarios. The computer processing unit compares the upcoming driving event with an ideal emissions model having acceptable emission thresholds to determine an adaptive driving strategy. The adaptive driving strategy configures the system vehicle to reduce emissions for the upcoming driving event.

The adaptive driving strategy optionally includes an optimal acceleration rate and/or an optimal power management strategy. The optimal acceleration rate is based upon the required speed of the vehicle at the upcoming driving event and the distance from the vehicle to the upcoming driving event, and the ideal emissions model having acceptable emission thresholds. The optimal acceleration rate is the acceleration rate with the lowest amount of vehicle emissions produced which can accelerate the vehicle from the vehicle's current velocity to the required speed of the upcoming event within the distance from the vehicle to the upcoming event.

The optimal power management strategy is used in combination with the optimal acceleration rate or independent thereof. Preferably, when the optimal power management strategy is used in combination with the optimal acceleration rate the optimal power management strategy is implemented only when the vehicle emissions exceed the acceptable thresholds and the system vehicle's acceleration rate is equal to the optimal acceleration rate and/or current vehicle speed is equal to the required speed at the upcoming event. In the alternative, the optimal power management strategy is implemented prior to the optimal acceleration rate or even if the system vehicle's acceleration rate is equal to the optimal acceleration rate and/or the system vehicle's velocity is equal to the required speed at the upcoming event.

The power management strategy includes several emission reducing actions, such as manipulating the system vehicle's environmental control system, deactivating nonessential electronic accessories and/or positioning the windows and sun/moon roof to a closed position. Each of the emission reducing actions under the control of the power management strategy is implemented according to an emission hierarchy which classifies each emissions reducing action according to the amount of reduction in emissions. An emission reducing action is implemented according to the emission hierarchy until the emissions of the vehicle are within the acceptable emission thresholds. Thus, allowing the emission reducing action with the highest reduction in emissions to be implemented first and if the emissions are still outside of the acceptable emission threshold the power management strategy will continue to implement an additional emission reducing action until the emissions are within the acceptable threshold.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF THE INVENTION

The present invention has utility as a system for reducing the emissions of a vehicle which overcomes the above-mentioned disadvantages. By using an adaptive driving strategy the system takes into account additional driving factors which provide for an additional reduction in emissions which is not afforded by prior known systems or methods. Further, as the additional driving factors are not taken into account by the prior systems, the inventive system can be implemented in combination with the prior systems to provide for an increased reduction in emissions.

The system and method are configured to be used in conjunction with a system vehicle having either an internal combustion engine or a hybrid power plant including both an internal combustion engine as well as an electric motor.

Figure 1:
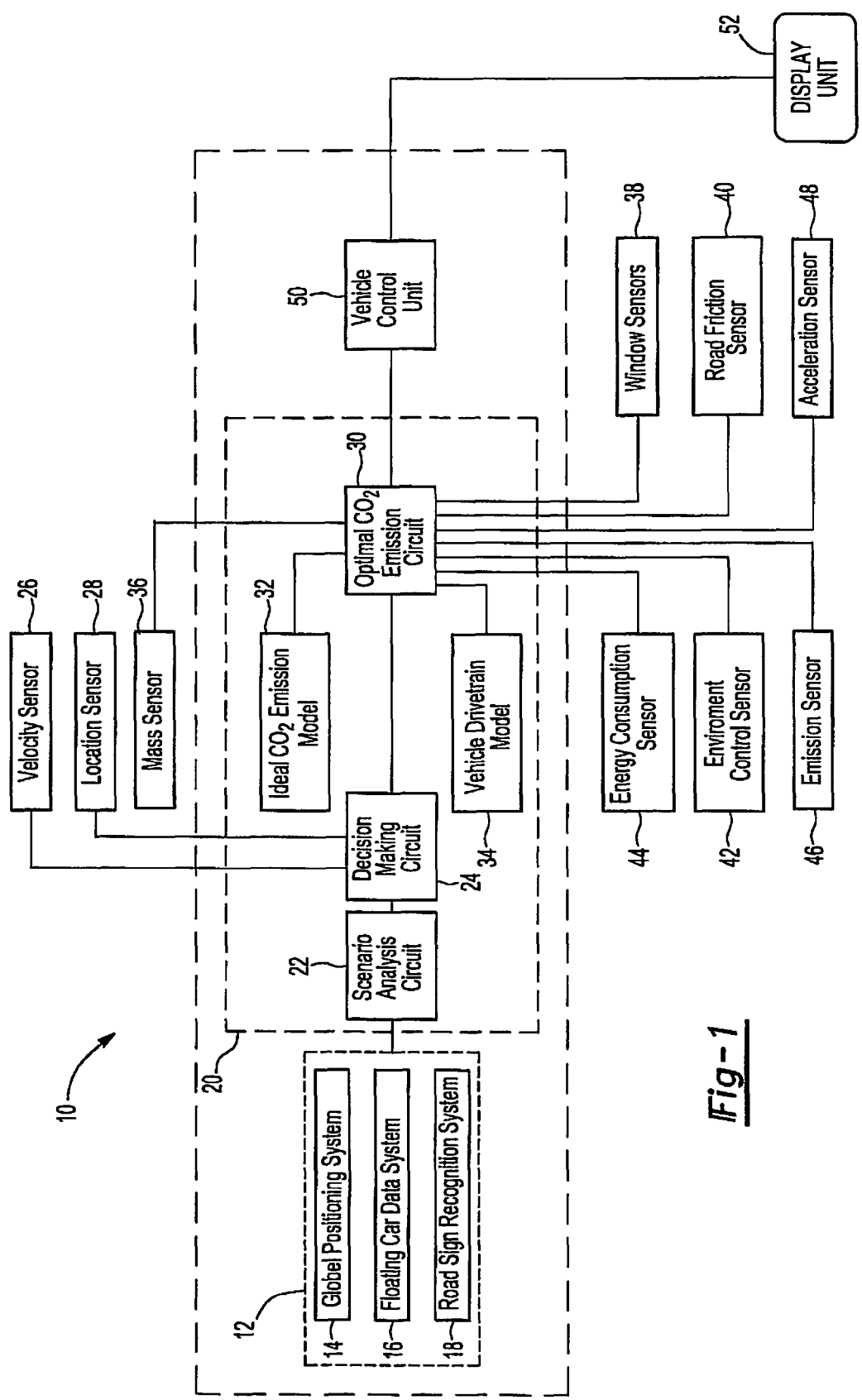
FIG. 1 is a block diagram of a system for reducing the emissions of a vehicle through the use of an adaptive driving strategy.

With reference to FIG. 1, an inventive system for reducing the emissions of a vehicle through the use of an adaptive driving strategy is illustrated generally at 10. The system 10 detects upcoming road scenarios through the use of a road scenario sensor 12. The road scenarios detected by the road scenario sensor 12 are any scenario that causes the system vehicle to deviate from its current state of operation (e.g. accelerating/decelerating or increasing/decreasing engine output while maintaining speed), and include, but are not limited to, speed limit scenarios, traffic scenarios, route scenarios. It will be appreciated that speed limit scenarios include the posted speed limit, including variable speed limit zones such as school zones which reduce the speed limit during school hours on school days. Traffic scenarios include traffic jams due to congestion or construction, accidents and other situations which require the system vehicle to travel at a speed less than the posted speed limit, such as rain, snow, ice or other weather conditions. Route scenarios include scenarios that would affect the speed and/or operation of the system vehicles such as stop signs, changes in elevation of the road, curves or turns in the road.

The road scenario sensor 12 is, optionally, a global positioning system (GPS) 14 with a map database having the geographic location of posted speed limits, stop signs, changes in road elevation, and any other road scenario that could have an effect on the system vehicle's speed or engine operation. The GPS 14, operating as the road scenario sensor 12, can detect speed limit scenarios and route scenarios by comparing the system vehicle's current location with the map database to detect upcoming scenarios in the system vehicle's current path.

The GPS 14 optionally detects traffic scenarios by wirelessly receiving real time and/or statistical data broadcast from a roadside infrastructure. The map database stored in the GPS 14 could be used to detect traffic scenarios by including a statistical database that contains historic average speeds for roads based on time and day. In addition to detecting speed limit scenarios, traffic scenarios and/or route scenarios, the GPS 14, acting as the road scenario sensor 12, is used as a location sensor to determine the location of the system vehicle.

The road scenario sensor 12 optionally further includes any sensor which is capable of detecting traffic scenarios such as statistical, real time or near real time traffic information on the average vehicle speed of a road in which the system vehicle is traveling. Such sensors, illustratively, include floating car data systems (FCD) 16 which combine vehicle-to-vehicle communication with infrastructure-to-vehicle communication. In FCD 16 systems traffic scenarios are calculated based upon vehicle speed and direction of travel collected from mobile phones contained within sensor vehicles, or through the use of a Dedicated Short Range Communication (DSRC) system, preferably a 5.9 Ghz DSRC system.

A road sign recognition (RSR) 18 system which uses a camera to recognize and read road and traffic signs is optionally included as a road scenario sensor 12. The RSR 18 system is capable of detecting route scenarios including stop signs and speed limit scenarios through the automatic detection and classification of road signs from images acquired from the system vehicle.

In a preferred embodiment, the road scenario sensor 12 includes a GPS 14 with map database capable of detecting speed limit scenarios, traffic scenarios and route scenarios, an FCD 16 system capable of detecting traffic scenarios, and an RSR 18 system capable of detecting speed limit scenarios and route scenarios. However, the system 10 is operable with any sensor capable of detecting speed limit scenarios, traffic scenarios, route scenarios, or any combination thereof.

The road scenarios, including speed limit scenarios, traffic scenarios, and/or route scenarios, are detected by the road scenario sensor 12 and communicated to a computer processing unit 20. The detected road scenarios along with the current vehicle speed are processed by a scenario analysis circuit 22 in the computer processing unit 20, to determine upcoming driving events of the vehicle. The current vehicle speed is detected by a velocity sensor 26, which can be the velocity sensor supplying input to the system vehicle's speedometer, a velocity sensor connected to the GPS 14 or any independent velocity sensor.

Upcoming driving events include, but are not limited to, accelerating the vehicle (increase in speed limit or average vehicle speed, increasing speed from a stop sign, traffic light or turn/intersection), decelerating the vehicle (decrease in speed limit or average vehicle speed, decreasing speed to come to a stop at a stop sign, traffic light or turn/intersection), and increasing or decreasing engine output by traveling uphill or downhill, respectively.

The scenario analysis circuit 22 compares the current vehicle speed with any detected speed limit scenario, traffic scenario or route scenario to determine if the upcoming driving event will affect the current vehicle speed or engine output. The scenario analysis circuit can determine an upcoming driving event even if the detected road scenario does not require a change in the current vehicle speed such as an increase in road grade which requires the system vehicle to increase engine output to maintain the current vehicle speed.

Once the upcoming driving events have been determined by the scenario analysis circuit 22 the upcoming driving events are processed by a decision making circuit 24 of the computer processing unit 20 which determines the required actions of the vehicle in order to comply with the upcoming driving events. The required actions of the vehicle include the required speed of the system vehicle at the upcoming driving event, and the distance from the vehicle to the upcoming driving event. The distance from the system vehicle to the upcoming driving event is calculated using the location of the system vehicle detected from GPS 14 acting as a location 28 sensor or an independent location sensor 28. The required speed of the upcoming driving event is determined by processing the detected road scenarios to determine the lowest detected speed.

The detected speed limit scenario is the default required speed, however, the default required speed can be lowered by a detected traffic scenario or route scenario with a lower speed. Preferably, whenever there are conflicting detected speeds, such as the GPS 14 map database detecting a speed of 50 mph and the RSR 18 recognizing and reaching a speed limit sign of 40, the decision making circuit 24 determines the default required speed as the lowest detected speed limit scenario.

The required actions of the vehicle are then processed by an optimal $CO_2$ emission circuit 30 of the computer processing unit 24 to determine an adaptive driving strategy which reduces the $CO_2$ emissions of the system vehicle. The adaptive driving strategy configures the operation of the system vehicle during the upcoming driving event to reduce the amount of emissions produced. The adaptive driving strategy optionally includes an optimal acceleration rate and/or an optimal power management strategy. The optimal acceleration rate is the acceleration rate with the lowest amount of vehicle emissions produced which can accelerate the system vehicle from the current vehicle speed to the required speed of the upcoming driving event. It will be appreciated that the optimal acceleration rate not only includes an acceleration rate capable of accelerating the system vehicle from the current vehicle speed to a higher required speed, but also a deceleration rate capable of decelerating the system vehicle from the current vehicle speed to a lower required speed.

The optimal power management strategy controls emission reducing actions which governs additional driving factors that contribute to $CO_2$ emissions due to increases in engine output. The increase in air resistance stemming from having the windows of the system vehicle in an open position result in an increase in $CO_2$ emissions due to the increase in engine output required to overcome the increase in air resistance. It will be understood, of course, that the term windows includes not only the conventional windows of a vehicle but also any controllable openings between the system vehicle's interior and the exterior which increase air resistance, such as moon roofs, sun roofs, rear windshields, and/or midgates.

In addition, there are other driving factors which increase $CO_2$ emissions due to increases in engine output. The operation of the system vehicle's environmental control system, specifically, the air conditioning unit diverts a portion of the engine's output to its operation, which requires an increase in engine output to maintain speed resulting in an increase in $CO_2$ emissions. Further, as vehicles are becoming more complex there is an increase in electronic energy consumption from integrated electronic devices, such as DVD players, and electronic accessories (cell phone chargers, MP3 players) powered by the vehicle's power outlets. The increase in energy consumption diverts a portion of engine output to running the electronic devices which requires an increase in engine output to maintain speed resulting in an increase in $CO_2$ emissions.

Therefore, the optimal power management strategy governs emission reducing actions such as the positions of the windows of the system vehicle, decreasing or deactivating the system vehicle's environmental control system, specifically the air conditioning unit, and/or reducing power to or deactivating the system vehicle's electronic devices and power outlets.

To produce the adaptive driving strategy an optimal $CO_2$ emission circuit 30 receives the required actions by the vehicle from the decision making circuit 24, and processes the required actions along with input from an ideal $CO_2$ emission model 32 and a vehicle drive train model 34. The ideal $CO_2$ emission model 32 and the vehicle drive train model 34 allow the optimal $CO_2$ emission circuit 30 to predict the amount of emissions that the system vehicle will produced while navigating the upcoming driving event. The optimal $CO_2$ emission circuit 30 is able to vary the inputs of the system vehicle to calculate an adaptive driving strategy which reduces the amount of emissions produced.

The ideal $CO_2$ emission model 32 may be of the type known as a comprehensive modal emissions model (CMEM) developed at the University of California at Riverside under sponsorship by the National Cooperative Highway Research Program (NCHRP). The CMEM can predict second-by-second vehicle emissions based upon input from operating variables and model parameters. Examples of input operating variables include the second-by-second speed of the system vehicle, the grade of the road, and accessory use information (e.g., air conditioning and nonessential electrical accessories). Modal parameters include generic types (e.g., vehicle mass, engine displacement, rolling friction, transmission efficiencies, etc.) and measured types (e.g., engine friction factor, thermal efficiency, catalyst pass friction, etc.).

The input for the operating variables of the ideal $CO_2$ emission model 32 is supplied by a plurality of vehicle operation sensors, including a velocity sensor 26, as described above, a window sensor 38, to detect the position of the windows to determine the increases in air resistance from a vehicle model, an environment control sensor 42, to detect the operation of the environmental control system, and an energy consumption sensor 44, to detect the operation of non-essential electronic vehicle accessories. In addition, input for the grade of the road can be from a separate elevation sensor or, preferably, from the map database of GPS 14.

The model parameters for the ideal $CO_2$ emission model 32 are supplied from the vehicle drive train model 34 and a plurality of vehicle status sensors including at least one mass sensor 36 and a road friction sensor 40. The at least one mass sensor 36 detects the increase in mass in excess of the default vehicle mass used in the optimal $CO_2$ emission circuit 30, and are positioned throughout the system vehicle where it is most likely that additional mass will be located. Positions of the at least one mass sensors 36 include the cargo areas, and the roof of the system vehicle in conjunction with a roof rack or other luggage securing apparatuses. The road friction sensor 40 detects the rolling friction between the system vehicle and the road. The system vehicle's traction control unit may optionally be used as the road friction sensor 40.

In order to determine the optimal acceleration rate, the optimal $CO_2$ emission circuit 30 enters the inputs from the plurality of vehicle operation sensors and vehicle status sensors into the ideal $CO_2$ emission model 32 and using the current vehicle speed and the required actions (i.e. the required speed at upcoming driving event and distance to the upcoming driving event) the optimal $CO_2$ emission circuit 30 enters data from the vehicle drive train model 34 representing various acceleration rates to predict emission produced by the various acceleration rates until it determines an optimal acceleration rate which is the acceleration rate with the lowest amount of vehicle emissions produced which can accelerate the system vehicle from the current vehicle speed to the required speed of the upcoming event with the distance to the upcoming event.

To determine the optimal power management strategy, the optimal $CO_2$ emission circuit 30 determines which emission reducing actions to take by detecting which of the vehicle operation sensors are in an emission producing state (i.e. environmental control system activated, non-essential electronic accessories activated and windows in an open position). The optimal power management strategy includes the corresponding emission reducing actions of the vehicle operation sensors in the emission producing state (i.e. deactivate the activated environmental control system, deactivated the activated non-essential electronic accessories, and close the windows in an open position).

The ideal $CO_2$ emission model 32 further includes predefined emission thresholds. The thresholds represent the maximum amount of allowable emissions which correspond to predetermined driving events (e.g. accelerating from 45 m.p.h. to 55 m.p.h. in 325 feet). The thresholds are vehicle specific and are variable according to additional factors, such as two wheel drive versus four wheel drive/all wheel drive mode of the vehicle, the amount of additional weight in the vehicle or being towed by the vehicle.

In a preferred embodiment, once the optimal $CO_2$ emission circuit 30 has calculated the optimal acceleration rate, the optimal $CO_2$ emission circuit 30 compares the emissions of the system vehicle when accelerating at the optimal acceleration rate to the predefined emission thresholds.

The emissions of the system vehicle when accelerating at the optimal acceleration rate are determined either by the optimal $CO_2$ emission circuit 30 using the same input used to determine the optimal acceleration rate. In the alternative, the system includes an emission sensor 46 for detecting the emissions of the system vehicle. In such an embodiment the actual emissions, as detected by the emission sensor, are compared to the acceptable emission threshold, rather than the optimal $CO_2$ emission circuit 30 predicting the system vehicle's emissions.

If after calculating an optimal acceleration rate the $CO_2$ emissions for the optimal acceleration rate are above the acceptable emission thresholds or if the required speed of the vehicle at the upcoming driving event is equal to the vehicle's current speed (for example the upcoming driving event is a change in road grade without a change in speed limit) the optimal $CO_2$ emission circuit 30 will calculate the optimal power management strategy which manipulates emission reducing actions to reduce $CO_2$ emissions.

The optimal $CO_2$ emission circuit 30 substitutes the input of the plurality of vehicle operation sensors that are that in an emission producing state (i.e. environmental control system activated, non-essential electronic accessories activated and windows in an open position) to the input which represents the emission reducing actions being occurred (i.e. environmental control system deactivated, non-essential electronic accessories deactivated and windows in an closed position). Examples of this include, if in predicting the emissions produced for the upcoming driving event, the environment control sensor 42 detected that the environmental control system was operating (i.e. in an emission producing state) the optimal $CO_2$ emission circuit 30 would replace that input with one that detected the environmental control system was deactivated (i.e. as if the emission reducing action of deactivating the environmental control system had occurred). The optimal $CO_2$ emission circuit 30 repeats this operation for the window sensor 38 (i.e. the emissions produced with the windows in a closed position) and the energy consumption sensor 44 (i.e. the emissions produced with the non-essential electronic accessories deactivated) and classifies each emission reducing action according to the amount of emissions reduced to produce a hierarchy of the optimal power management strategy.

The optimal driving strategy and/or the optimal power management strategy are then communicated from the computer processing unit 24 to a vehicle control unit 50 of the system vehicle capable of manipulating vehicle parameters to implement the adaptive driving strategy. The vehicle control unit 50 is capable of manipulating vehicle parameters such as the drive train of the system vehicle to control the acceleration rate in order to implement the optimal acceleration rate. The optimal power management strategy is implemented by the vehicle control unit 50 which manipulates vehicle parameters including the electronical controls of the windows, the environmental control system, and the non-essential electronic devices to accomplish the emission reducing actions.

The optimal acceleration rate and/or the optimal power management strategy may be implemented by the vehicle control unit 50 through a number of different modes. In an advisory mode the vehicle control unit 50 directs a display unit 52 to indicate to a driver of the system vehicle the adaptive driving strategy. The display unit 52 guides the driver to reach the optimal acceleration rate through the use of brake or accelerate messages until the optimal acceleration rate has been reached by the driver. The power management strategy is communicated to the driver through the display unit 52 by listing the systems to deactivate and/or prompting the driver to close the windows of the vehicle.

The adaptive driving strategy may be implemented through an active control mode which will configure the system vehicle to the adaptive driving strategy automatically, but allows the driver to override the implementation. In a mandatory implementation mode the vehicle control unit 50 automatically configures the system vehicle to the adaptive driving strategy and the driver of the system vehicle is unable to override such implementation. The adaptive driving strategy may be implemented by any such mode or by any such combination of modes.

In a preferred embodiment the optimal driving strategy is implemented in the active control mode while the optimal power management strategy is implemented in an advisory role. However, the optimal power management strategy may itself be implemented through any combination of modes, such as an advisory implementation of positioning the windows in the closed position (this allows for an avoidance of trapping an object or a portion of the driver with the window), the deactivation of the air conditioning control unit is implemented by an active control and the deactivation of nonessential electronic devices is implemented through mandatory implementation.

It will be appreciated that although the above described system and method relates to the optimization of $CO_2$, of which there are particular advantages, the system and method can be used to reduce other types of vehicle emissions, illustratively including carbon monoxide (CO), nitrogen oxides, (NOx) and hydrocarbons.

Figure 2:
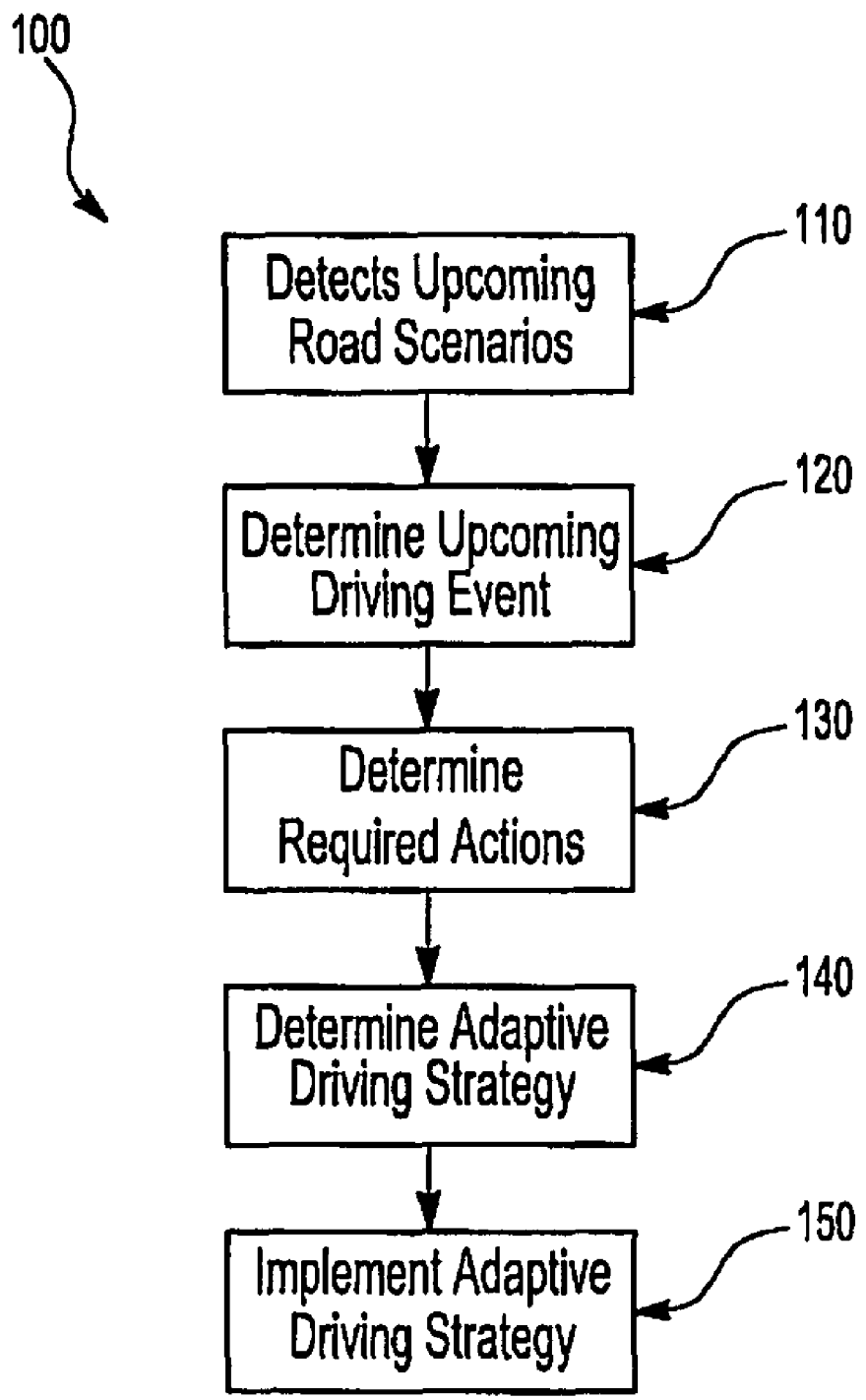
FIG. 2 is a flowchart illustrating the method of reducing the emissions of a vehicle through the use of an adaptive driving strategy.

In order to facilitate an understanding of the principles associated with the disclosed system, its method of operation, generally illustrated at 100 in FIG. 2, will now be briefly described. The system 10 first detects upcoming road scenarios (e.g., stop sign, speed limit or a change in the road grade) 110 through the use of a road scenario sensor 12. The road scenario is communicated from the road scenario sensor 12 to a computer processing unit 20. A scenario circuit 22 of the computer processing unit 20 processes the detected road scenario along with the vehicle's current speed to determine upcoming driving events 120. Next, the system 10 determines the required actions 130 of the system vehicle to comply with the upcoming driving event by processing the upcoming driving event through a decision making circuit 24 of the computer processing unit 20.

The system 10 determines an adaptive driving strategy 140 which configures the system vehicle to reduce emissions for the upcoming driving event. The adaptive driving strategy is determined by an optimal $CO_2$ emission circuit 30 using an ideal $CO_2$ emission model 32 with acceptable emission thresholds, a vehicle drive train model 34, the required actions of the vehicle, and input from the plurality of vehicle operation sensors and vehicle status sensors. The adaptive driving strategy optionally includes an acceleration rate and/or an optimal power management strategy.

The optimal acceleration rate is the acceleration rate with the lowest amount of vehicle emissions which can accelerate the vehicle from the vehicle's current speed to the required speed of the upcoming driving event within the distance from the vehicle to the upcoming driving event. In a preferred embodiment, if the current vehicle speed is equal to the required speed of the vehicle at the upcoming driving event or the acceleration rate of the vehicle is equal to the optimal acceleration rate and the emissions of the vehicle are in excess of the acceptable thresholds, the optimal $CO_2$ emission circuit 30 determines the optimal power management strategy.

The optimal power management strategy includes a number of emissions reducing actions which are classified in an emissions hierarchy according to the amount of reduction in emissions that each emissions reducing action provides. The emission reducing actions are applied to the optimal power management strategy according to the emissions hierarchy until the emissions are within the acceptable thresholds. Finally the system 10 implements the adaptive driving strategy 150 by communicating the optimal driving strategy and/or the optimal power management strategy from the optimal $CO_2$ emissions circuit 30 of the computer processing unit 20 to a vehicle control unit 50.

From the foregoing, it can be seen that the present invention provides a unique system and method for reducing the emissions of a vehicle through the use of an adaptive driving strategy. Having described the inventive system, however, many modifications thereto will become apparent to those skilled in the art to which it pertains without deviation from the spirit of the invention as defined by the scope of the appended claims.

It is claimed:

1. A system for reducing the emissions of a vehicle through the use of an adaptive driving strategy, said system comprising:
    a road scenario sensor for detecting upcoming road scenarios;
    a vehicle control unit capable of manipulating vehicle parameters; and
    a computer processing unit having an ideal emission model, said computer processing unit receives an input from said road scenario sensor to determine an upcoming driving event, said computer processing unit compares said upcoming driving event with said ideal emission model to determine a driving strategy which configures the vehicle to reduce emissions for said upcoming driving event;
    wherein said vehicle control unit implements said driving strategy.

2. The system of claim 1, wherein said computer processing unit further comprises:
    a scenario analysis circuit which process said detected road scenarios to determine said upcoming driving events of the vehicle;
    a decision making circuit which process said upcoming driving events to determine required actions of the vehicle to comply with said upcoming driving events; and
    an optimal emission circuit having said ideal emission model and a vehicle drive train model;
    said optimal emission circuit compares said required actions of the vehicle with said ideal emission model and said vehicle drive train model to determine an adaptive driving strategy which configures the vehicle to reduce emissions while conducting said required actions.

3. The system of claim 2, further comprising:
    a location sensor to detect a current location of the vehicle; and
    a velocity sensor to detect a current vehicle speed;
    wherein said required actions of the vehicle include a required speed of the vehicle at said upcoming driving event and a location of said upcoming driving event;
    said road scenario sensor detects a location of the said road scenario;
    wherein said adaptive driving strategy is an optimal acceleration rate which accelerates the vehicle from the current vehicle speed to said required speed within a distance between said current location of the vehicle and said location of said upcoming driving event with a lowest amount of emissions produced;
    wherein said vehicle control unit manipulates said parameters of the vehicle such that said vehicle acceleration is equal to said optimal acceleration rate.

4. The system of claim 2, further comprising:
    a plurality of vehicle operation sensors which detect additional driving factors that relate to the production of emissions;
    wherein said optimal emissions circuit determines an adaptive driving strategy which includes an optimal power management strategy having at least one emissions reducing action.

5. The system of claim 4, wherein said plurality of vehicle operation sensors includes a window sensor for detecting whether each of the windows of the vehicle is in an open or closed position;
    said vehicle control unit is further capable of manipulating the parameters of the vehicle to control the position of each of the windows of the vehicle; and
    wherein said optimal power management strategy includes said emissions reducing action of positioning windows detected in an open position to a closed position.

6. The system of claim 4, wherein said plurality of vehicle operation sensors includes an environmental control sensor for detecting an operation of an environmental control system of the vehicle;
    said vehicle control unit is further capable of manipulating the parameters of the vehicle to control the operation of the environmental control system; and
    wherein said optimal power management strategy includes the emissions reducing action of deactivating the environmental control system.

7. The system of claim 4, wherein said plurality of vehicle operation sensors includes an energy consumption sensor to detect an operation of non-essential electronic accessories of the vehicle;
    said vehicle control unit is further capable of manipulating the parameters of the vehicle to control the operation of non-essential electronic accessories; and
    wherein said optimal power management strategy includes said emissions reducing action of deactivating non-essential electronic accessories.

8. The system of claim 4, wherein said optimal power management strategy is implemented according to an emissions hierarchy, said hierarchy classifies each of said emissions reducing action under the control of said optimal power management strategy according to an amount of reduction in emissions afforded by each of said emissions reducing actions, and said hierarchy implements said emissions reducing actions with a highest amount of reduction in emissions prior to said emissions reducing actions with a lowest amount of reduction in emissions.

9. The system of claim 2, wherein said ideal emissions model is an ideal $CO_2$ emissions model.

10. A system for reducing the emissions of a vehicle through the use of an adaptive driving strategy, said system comprising:
    a road scenario sensor to detect upcoming events, said road sensor capable of determining a required speed of the vehicle at said upcoming event and a distance from the vehicle to said upcoming event;

an emission sensor to detect an actual emissions of the vehicle;

a velocity sensor to determine a velocity of the vehicle;

an acceleration sensor to determine an acceleration of the vehicle;

a vehicle control unit to capable of manipulating an operation of a drive train of the vehicle; and a computer processing unit having an ideal emission model with acceptable emission thresholds and a drive train model of the vehicle stored therein;

wherein said computer processing unit determines a type of upcoming event of the vehicle based upon input from said road scenario sensor and determines upcoming actions of the vehicle required to comply with said upcoming event;

said computer processing unit determines an optimal acceleration rate based upon said required speed, said distance to said upcoming event, said vehicle velocity, said vehicle acceleration, said ideal emission model and said drive train model, said optimal acceleration rate being an acceleration with the lowest amount of vehicle emissions produced which will accelerate the vehicle from said vehicle velocity to said required speed within said distance to said upcoming event;

wherein said vehicle control unit manipulates the operation of the drive train of the vehicle such that said vehicle acceleration is equal to said optimal acceleration rate.

11. A method of reducing the emissions of a vehicle through the use of an adaptive driving strategy, said method comprising the steps of:

determining an upcoming event of the vehicle;

determining upcoming actions of the vehicle required to comply with said upcoming event;

comparing said determined upcoming actions of the vehicle with an ideal emission model:

determining an adaptive driving strategy that reduces vehicle emissions for said upcoming actions; and implementing said adaptive driving strategy.

12. The method of claim 11, wherein the step of determining said upcoming vehicle actions comprises determining a current vehicle speed, a distance from the vehicle to said upcoming event and a required speed of the vehicle at said upcoming event.

13. The method of claim 12, wherein the step of determining an adaptive driving strategy comprises determining an optimal acceleration rate of the vehicle, said optimal acceleration rate is based upon said current vehicle speed, said required speed, said distance to said upcoming event, said ideal emission model of the vehicle and a model of a drive train of the vehicle, and wherein said optimal acceleration rate is an acceleration rate with a lowest amount of vehicle emissions produced which is capable of accelerating the vehicle from said current velocity to said required speed within said distance to said upcoming event.

14. The method of claim 13, wherein said vehicle emissions model is a $CO_2$ emissions model.

15. The method of claim 13, wherein the step of determining an adaptive driving strategy further comprises determining an optimal power management strategy having at least one emissions reducing action that manipulates an additional driving factor to reduce said amount of emissions produced.

16. The method of claim 15, wherein said optimal power management includes an emissions reducing action of positioning windows detected in an open position to a closed position.

17. The method of claim 15, wherein said optimal power management includes an emissions reducing action of deactivating an environmental control system.

18. The method of claim 15, wherein said optimal power management includes an emissions reducing action of deactivating non-essential electronic accessories.

19. The method of claim 15, wherein said optimal power management strategy is implemented according to an emissions hierarchy, said hierarchy classifies each emissions reducing action under the control of said adaptive driving strategy according to an amount of reduction in emissions afforded by each of said emissions reducing actions, and wherein said emissions reducing actions with a highest amount of reduction in emissions are implemented prior to said emissions reducing actions with a lowest amount of reduction in emissions.

* * * * *

UNITED STATES PATENT AND TRADEMARK OFFICE
CERTIFICATE OF CORRECTION

| | | |
|---|---|---|
| PATENT NO. | : 8,145,376 B2 | Page 1 of 1 |
| APPLICATION NO. | : 12/371815 | |
| DATED | : March 27, 2012 | |
| INVENTOR(S) | : Rini Sherony | |

It is certified that error appears in the above-identified patent and that said Letters Patent is hereby corrected as shown below:

On the Title Page:
(57) Abstract, line 5, after determines, delete "a", insert --an--.

In the Specification:
At column 5, line number 56, delete "produced", insert --produce--.

At column 6, line number 4, delete "modal", insert --model--.

At column 6, line number 58, delete "deactivated", insert --deactivate--.

At column 7, line number 28, after that are, delete "that".

At column 7, line number 34, delete "an", insert --a--.

In the claims:
At column 11, line number 8, after unit, delete "to".

Signed and Sealed this
Second Day of October, 2012

David J. Kappos
*Director of the United States Patent and Trademark Office*